Figure 2:
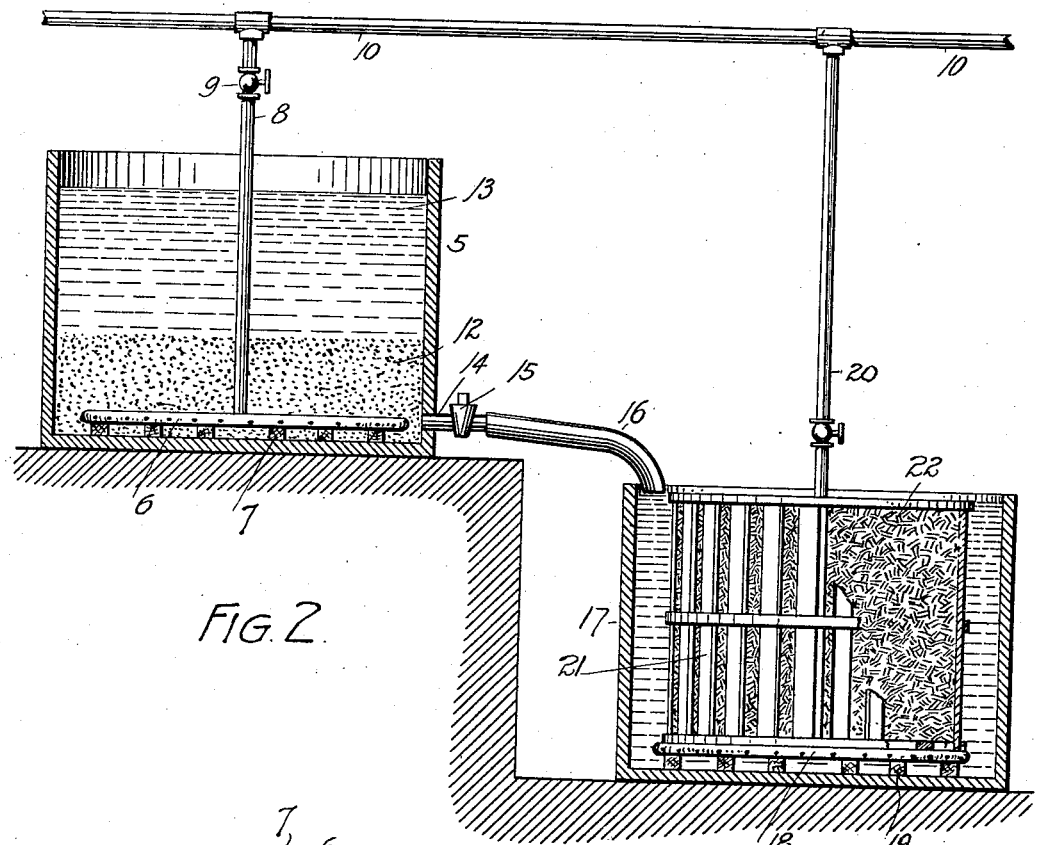

No. 689,835. Patented Dec. 24, 1901.
G. H. WATERBURY.
PROCESS OF EXTRACTING COPPER FROM ORES.
(Application filed Apr. 3, 1901.)
(No Model.)

WITNESSES: INVENTOR.
Geo. H. Waterbury
BY
ATTORNEY.

UNITED STATES PATENT OFFICE.

GEORGE H. WATERBURY, OF DENVER, COLORADO, ASSIGNOR OF ONE-HALF TO FRANK WILLIAMS, OF DENVER, COLORADO.

PROCESS OF EXTRACTING COPPER FROM ORES.

SPECIFICATION forming part of Letters Patent No. 689,835, dated December 24, 1901.

Application filed April 3, 1901. Serial No. 54,192. (No specimens.)

*To all whom it may concern:*

Be it known that I, GEORGE H. WATERBURY, a citizen of the United States of America, residing at Denver, in the county of Arapahoe and State of Colorado, have invented certain new and useful Improvements in Processes of Extracting Copper from Ores; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a process of extracting copper from ores, my object being to lessen the time necessary to effect this separation under ordinary conditions and by the employment of the processes heretofore known.

My process, broadly stated, consists of two steps—first, the leaching of the copper from the ores, whereby the copper is placed in the form of a solution, and, second, the precipitation of the copper from the solution. The novel feature of my invention consists in the use of hot air during both steps of the process. These successive steps of the copper-extracting process will now be described in their order.

The ore containing the copper to be extracted is first ground or pulverized to a suitably-fine mesh and then placed in a tank, in the bottom of which is laid a perforated lead pipe. Water and such acid or acids as may be necessary, according to the character of the ore, are then placed in the tank with the ore and hot air under pressure introduced into the perforated pipe in the bottom of the tank, whereby the air escapes and passes upwardly through the ore and water. I have discovered that by forcing the oxygen of superheated atmospheric air through copper ores, as above described, a great saving of time in the leaching of copper is attained over the old method or any other method now in vogue so far as I am aware. The time required by my process for the leaching of the copper is from thirty to sixty minutes approximately. The copper in solution as the result of the leaching is drawn off into a precipitating-tank of sufficient size containing scrap-iron or other suitable metal or iron or metal pieces of such size as to allow the solution to flow readily therethrough. Over the top of this tank a supply-pipe leading from the heater and air-compressor is constructed, so as to convey a sufficient volume of hot compressed air through a lead, iron, or other suitable pipe to the bottom of the precipitating-tank, where this pipe is extended over the bottom of the tank by means of branches or a corkscrew-coil or in any other suitable manner. In this coil or in these branches of the pipe distributed over the bottom of the tank, as aforesaid, are formed small holes or perforations for the escape of the air into the solution. This air escaping into the bottom of the tank beneath the solution rises through the iron or other metal suspended or otherwise suitably placed in this solution. This process causes the precipitation of the copper from the solution, the copper settling in the form of slimes at the bottom of the tank. This precipitation is supposably by reason of the violent action of the compressed and heated air passing rapidly in and through the iron or other metal, and in any event the process results in much more rapid precipitation of the copper in the solution than can be gained by the old way of slow mechanical agitation now in vogue. The precipitation of the copper can be effected in the manner aforesaid in from twenty to thirty minutes approximately.

I have discovered and thoroughly proved the fact that, by the forcing of superheated compressed air at a rapid rate of speed through a mass of iron suspended in a solution of copper, the precipitation takes place in much less time than by the ordinary method of precipitation. So far as I am aware this principle has never been discovered or demonstrated.

In the accompanying drawings suitable apparatus is illustrated for carrying out the process, though nothing is claimed in this application on any particular mechanism or apparatus; neither do I limit myself to the employment of any specific mechanism or apparatus for use in practicing the process, as I am aware that many different mechanical appliances may be used. In the accompanying drawings one form of apparatus that may be successfully employed is illustrated.

Figure 1:
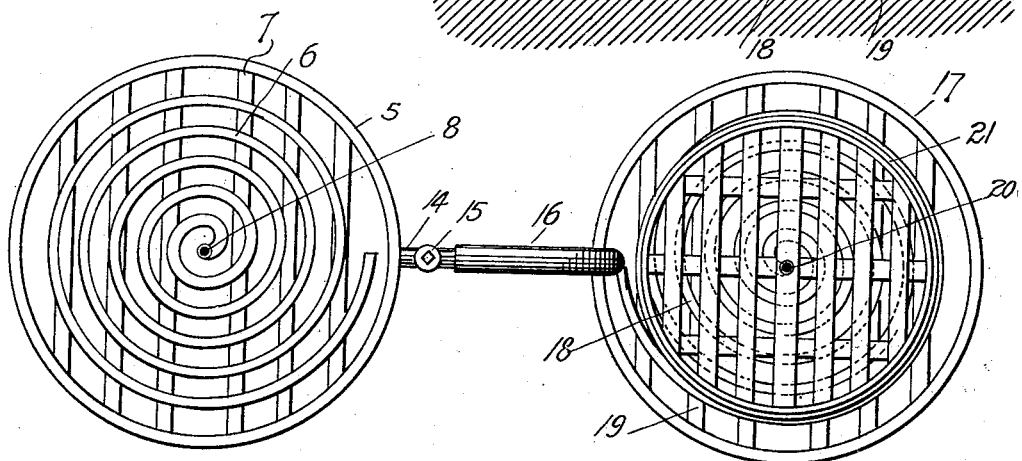

Figure 1 is a top or plan view; and Fig. 2, a vertical section taken on the line x x, Fig. 1, parts being shown in elevation.

The same parts or elements in both views being indicated by the same characters of reference, let the numeral 5 designate a leaching-tank in which is placed a coil 6, of perforated pipe, the perforations being arranged to direct the air-jets downwardly. This coil is supported by cross pieces or slats 7, placed in the bottom of the tank, and communicates or is continuous with a stand-pipe 8 for supplying hot air under pressure. This pipe is provided with a valve 9 for cutting off or regulating the flow of air and communicates at its upper extremity with a main air-supply conduit 10. Let 12 designate the ore in the tank and 13 the liquid above the ore. Communicating with the lower part of the tank is an outlet 14, provided with a valve 15. The liquid containing the copper in solution is drawn off from the tank 5 through the outlet 14 and passes thence by way of a conduit 16 into the wooden precipitating-tank 17, in the bottom of which is placed a perforated lead-pipe coil 18, resting on strips or cross-pieces 19 and communicating with a stand-pipe 20 for the introduction of hot air under pressure from the main conduit 10. A valve 27 is placed in the pipe to regulate and control the supply of air to the tank. In this tank, which contains water, is placed on top or above the coil of pipe an open wooden skeleton cage 21, containing a quantity of scrap-iron 22, through which the liquid passes and circulates freely. The perforations in the pipe 18 are preferably so formed as to direct the air-jets downwardly.

Having thus described my invention, what I claim is—

1. The herein-described process of precipitating copper in solution, consisting in placing the solution in a tank or receptacle containing pieces of iron small enough to allow the solution to pass readily therethrough, and introducing hot air under pressure into the solution.

2. The herein-described process of extracting copper from ores, consisting in placing the suitably-pulverized ore in a leaching-tank with such water and acid as may be necessary, and introducing hot air into the tank, drawing off the copper solution thus formed, into a tank or receptacle containing pieces of iron small enough to allow the solution to pass readily therethrough, and finally introducing hot air into the solution.

In testimony whereof I affix my signature in presence of two witnesses.

GEORGE H. WATERBURY.

Witnesses:
DORA C. SHICK,
MARY C. LAMB.